Jan. 14, 1930.  F. A. PARSONS  1,743,384
CLUTCH
Filed Sept. 4, 1925
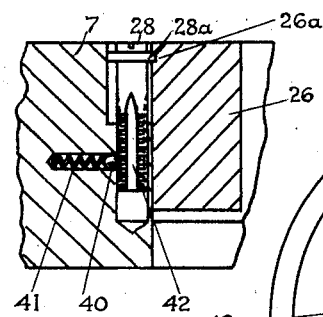
Fig. 4
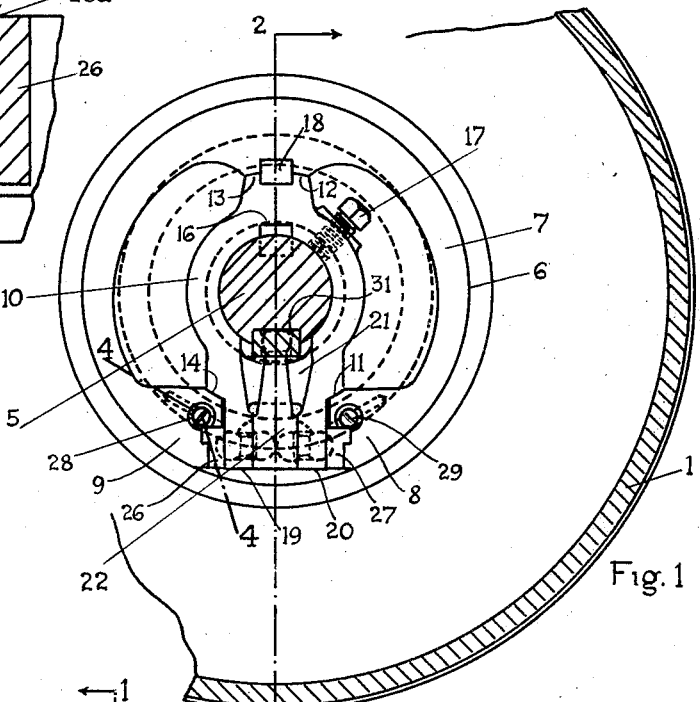
Fig. 1
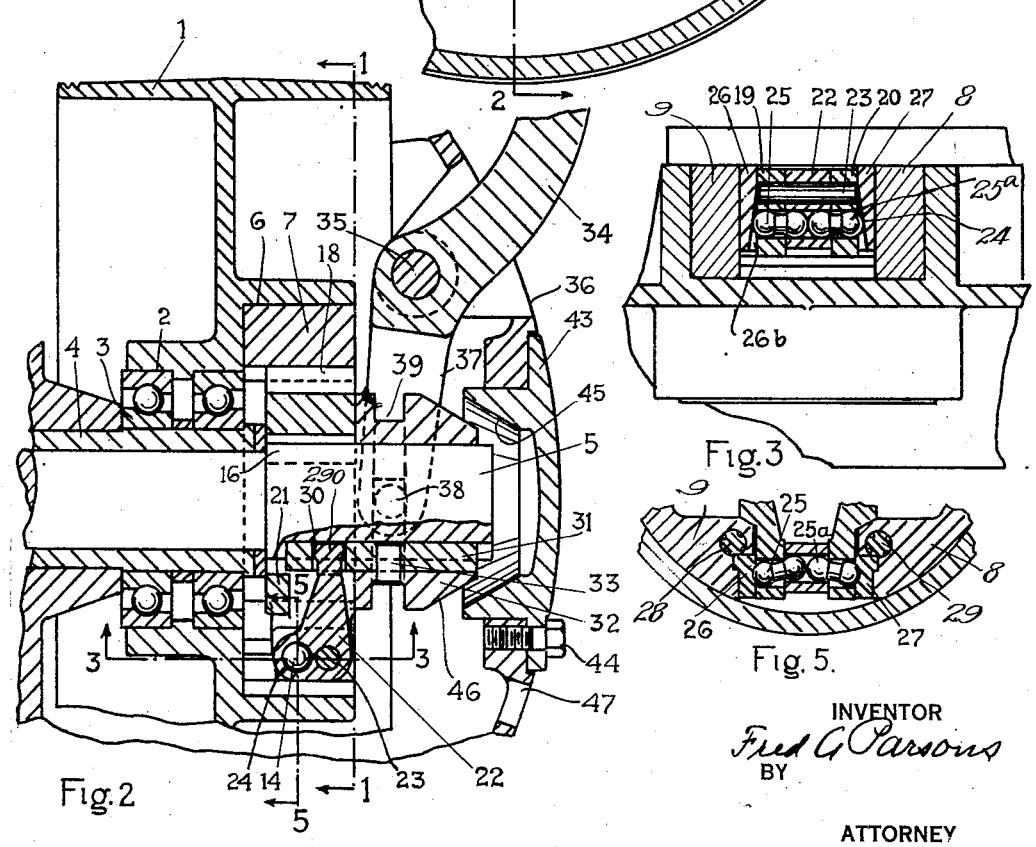
Fig. 2
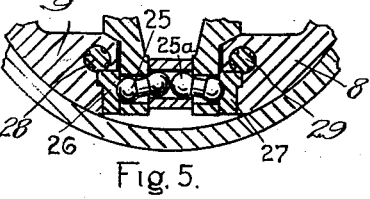
Fig. 3
Fig. 5.
INVENTOR
Fred G. Parsons
BY
ATTORNEY Patented Jan. 14, 1930

1,743,384

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

CLUTCH

Application filed September 4, 1925. Serial No. 54,464.

This invention relates generally to clutches of the type known as friction clutches.

A main object is to provide a friction ring type of clutch in which provision is made for a relatively great amount of movement of the ring member, also for a relatively great amount of adjustment to provide for wear of the friction surface also for improved adjusting mechanism and for an improved expanding mechanism capable of exerting great force or pressure at the moment or point of engagement.

A further object is to provide a clutch particularly adapted as a main or primary driving clutch to be associated with a primary drive pulley.

Other objects are generally to simplify and improve the construction and operation of clutches and particularly when associated a main drive pulley for the operation of various machines.

With these and other objects in mind reference may be had to the accompanying drawings in which like reference numerals indicate the same parts on each of the several views, of which Fig. 1 is a partial section transversely through a drive pulley associated with a clutch embodying my invention and along line 1—1 of Fig. 2.

Fig. 2 is an axial partial section through the pulley and clutch along line 2—2 of Fig. 1.

Fig. 3 is a section through a portion of the mechanism along line 3—3 of Fig. 2.

Fig. 4 is an enlarged sectional portion showing one of the adjusting members along line 4—4 of Fig. 1.

Fig. 5 is a portion of the mechanism shown in Fig. 3 but in a different position of adjustment and taken along line 5—5 of Fig. 2.

A pulley 1 is rotatably supported on antifriction bearings 2 the inner rings 3 of which are fixed on the outside of a sleeve or bushing 4. A shaft 5 is rotatably journaled in the axial bore of bushing 4 and may be driven from pulley 1 or may be restrained against movement by the means which will be described.

Pulley 1 is provided with a bore 6 in which is rotatably supported a ring member 7, the ends 8 and 9 of which are spaced apart to provide an opening or space for several members to be later described and thickened or enlarged to provide a seat or thrust bearing for some of the members and for other reasons. The ring member 7 not being a complete ring is expandable and when contracted is normally supported from a spider or support member 10 at contact points 11, 12, 13, 14, the several contact points on member 10 being in the periphery of a circle having its center on the axis of shaft 5. When the complementary points are formed inside of the ring 7 they are formed on a somewhat smaller circle so that when in position as described the ring is slightly expanded and centers itself exactly, whereby the outer diameter of ring 7 then forms a nearly exact circle having its center on the axis of shaft 5 but not touching the interior of bore 6 unless the ring 7 is still further expanded.

The member 10 is keyed to shaft 5 by the means of a key 16 and restrained from shifting along the shaft by a screw 17 threaded in member 10 and bearing on the shaft, and is keyed with ring 7 by the means of a key 18.

Arms 19 and 20 project from the member 10 into the space between the ends 8 and 9 of ring 7 and are connected together to provide rigidity by an integral portion 21. The arms 19 and 20 provide a support for a lever 22 movable between the arms on a pivot pin 23 fixed in each of the arms. Offset from the pivot pin 23 is a bore passing through both the arms 19 and 20 and through lever 22. This bore is generally denoted in Figs. 2 and 3 by the numeral 24.

Located in bore 24 are a plurality of toggle members 25 and 25ª each formed with ball shaped ends integral with a central portion of reduced diameter. The members 25 and 25ª are placed end to end in the bore 24 and thrust blocks 26 and 27 are provided for the outer ends of the resulting toggle.

The toggle members 25 and 25ª are movable with the lever 22 as the lever is moved about its pivot pin 23 and when the lever is in one position of its movement the toggle members take up a position corresponding to Fig. 5 in which the axes of the two toggle members are at an angle with one another and the distance between the two toggle ends measured in a plane at right angles to shaft 5, is less than when the toggle members are in another position, as shown in Fig. 3 in which the axes of the two members are aligned. As previously noted the toggle members 25 and 25ª seat or abut against the blocks 26 and 27 which in turn seat against the ends 8 and 9 of ring 7. When the toggle members are in the position shown in Fig. 3 they occupy a maximum space and the ends of the ring 7 are forced apart thus expanding the ring to fit tightly in bore 6 of pulley 1. When the toggle members are in the position shown in Fig. 5 they occupy considerably less space and the ring may then contract and free itself from the pulley 1, centering itself on the member 10 as previously explained. The toggle member ends thrust in opposite directions but it may be noted that the thrust direction is substantially in a plane vertical to the axes of rotation of ring 7. Owing to the centering action of the ring 7 on the member 10 but very little movement of contracting is required to free the ring from all rubbing contact with the interior of bore 6 and such as is required is amply provided by the decrease in space occupied by the toggle members 25 and 25ª when in the position shown in Fig. 5.

Minor variations in size of parts when manufactured and wear of the various parts in use, requires that an adjustment be provided whereby such variations may be compensated for.

The thrust blocks 26 and 27 are each adjustable in a direction parallel with the axis of the shaft 5 by the means of screws 28 and 29 one of which is illustrated in detail in Fig. 4 in its relationship to one of the members. The screws 28 and 29 are similar and blocks 26 and 27 are similar but for purposes of description Fig. 4 may be considered as representing block 26 and screw 28, it being understood that the construction of the other screw and block is the same.

Screw 28 has an enlarged collar 28ª integral therewith and engaging with a slot 26ª in block 26 and is threaded into ring 7, whereby turning the screw in the one or the other direction moves the block in the one or the other direction in a plane parallel to the axis of shaft 5. The block 26 is provided with a groove 26ᵇ providing a seat of proper form for the head of the toggle member 25 and having an angular relationship with the direction of the above described movement of the block 26 as shown in Fig. 3.

As one or both of the blocks 26 and 27 are adjusted in the proper direction the total effective space occupied by the blocks and toggle members together, becomes either less or more in accordance with the direction of block movement and it is apparent that such changes will affect the space occupied by the ring 7 when the toggle members are in the ring expanding position shown in Fig. 3. Such adjustment of the blocks provides amply for the adjustments mentioned above, and by the use of two adjustable blocks the range of adjustment is very materially increased, there being limitations to the adjustment obtainable by one adjustable block.

To move the lever 22 and thus cause the toggles to take the positions shown in Fig. 5 to release the clutch or the position shown in Fig. 3 to engage the clutch, the lever 22 is provided with an end portion 290 of partial ball form and fitted snugly in a bore 30 of a bar member 31 which is fixed for movement with a spool member 32 by the means of a pin 33. The bar member fits slidably in a groove in shaft 5, the spool 32 fits slidably on the shaft 5, the bar 31 thus acting as a key to rotate spool 32 with the shaft, while permitting it to slide thereon together with bar 31. The spool may be moved in either direction axially of shaft 5. A lever arm 37 carries a pivoted pin or shoe 38 engaging with an annular groove 39 in spool 32, the lever being pivoted on a pin 35 supported from a housing member 36 fixed with the machine which is to be driven from pulley 1. Another arm 34 of the same lever projects outside housing member 36 and may be manually or otherwise operated to cause movement in either direction of spool 32 and hence through the previously described mechanism to the lever 22, to cause the desired movement of the toggle members.

By the above described mechanism a great mechanical advantage is obtained at the moment that the toggle members approach the axially aligned position shown in Fig. 3, and without sacrifice of comparatively rapid movement of the parts when approaching this position from the position shown in Fig. 5, and a very compact and rigid arrangement of connecting mechanism is achieved whereby the effect of such mechanical advantage is not lost by springing or distortion of the parts through which the great pressure thus available to expand ring 7 in bore 6, is transmitted.

To yieldingly retain adjusting screws 28 and 29 in their various positions of adjustment, mechanism is used as illustrated in Fig. 4 for screw 28. A ball 40 is pressed by a spring 41 and as the screw revolves for adjustment may seat in one of a set of grooves 42 suitably fashioned and spaced on the screw. When so seated the ball will yieldingly restrain the screw to prevent undesired movement until again adjusted.

In a clutch of the particular type in which engagement to drive a shaft 5 from a driving pulley or member 1 is brought about by the expansion of a ring such as 7, the ring is subjected when once engaged to considerable centrifugal forces due to its speed of rotation. Such force tends to maintain the ring in an expanded engaged condition even though the ring expanding means be moved to a position permitting the ring to free itself from engagement with the bore 6. To insure that the ring shall be brought to a stop when the ring expanding means are shifted to a clutch disengaging position a brake is provided. It is obvious that once the ring has been brought to a stop the centrifugal force will cease to act and the resiliency of the ring may then be depended upon to cause the ring to free itself from the bore 6 and seat on the surfaces, 11, 12, 13, 14.

The movement of spool 32 to the right in Fig. 2 brings about the position of toggle members 25 and 25a as shown in Fig. 5, that is to say permits release of the clutch, and to insure that the ring 7 releases when the parts are in this position, suitable brake mechanism is provided to stop rotation of the ring as follows.

The housing member 36 is provided with a brake member 43 fixed in position by the means of a screw 44 and which is provided with a tapered or conical bore 45 the axis of which coincides with the axis of shaft 5 when member 44 is in place. Spool 32 is provided with a complementary exterior cone shaped portion 46, which when the spool is shifted to the right to release the clutch as above noted engages with the conical bore 45. The member 43 being fixed against movement, the frictional engagement of the two parts very quickly brings ring 7 to a stop and thereby permits contraction of the ring.

It is contemplated that the housing member 36 may be made removable from the supporting machine and when so removed the clutch adjusting screws 28 and 29 are freely exposed and may be easily adjusted. Such removal of member 36 is not necessary however. A hole or opening 47 is provided in the housing member 36 through which a screw driver or other suitable adjusting tool may be inserted and the screws 28 and 29 being positioned for adjustment in a direction parallel with the axis of shaft 5 may readily be adjusted by such means.

Having now fully explained my invention in one of the embodiments thereof, I claim:

1. In a clutch having a rotatable and expandable friction ring, provided with an opening, the combination of a rotatable shaft axially concentric with the axis of said ring, a member fixed with said shaft and provided with exterior ring bearing surfaces and with a plurality of arms spaced apart in said opening, and ring expanding means including a lever pivoted between said arms.

2. In a clutch having a rotatable and expandable friction ring provided with an opening, the combination of a rotatable shaft axially concentric with the axis of said ring, a member fixed with said shaft and having arms spaced apart in said opening, and ring expanding means including a movable lever pivoted between said arms and a plurality of toggle members each having its one end supported from one of said arms and the other end movable from the movement of said lever.

3. In a clutch having a rotatable friction ring provided with an opening, the combination of a rotatable shaft concentric with the axis of said ring, a member fixed with said shaft and having arms spaced apart in said opening, means for changing the friction surface diameter of said ring including a movable lever pivoted between said arms and a plurality of toggle members each having its one end supported from one of said arms and the other end movable from the movement of said lever, and an adjusting member cooperative with said arms and likewise effective to change the diameter of said surface; the adjusting movement of said member being in a direction substantially parallel to the axis of said ring.

4. A clutch as specified in claim 3 having a second adjusting member having movement in a direction substantially parallel to the axis of the ring; each of the adjusting members being independently movable.

5. In a clutch, the combination of an expandable friction ring providing an opening, ring expanding means located in said opening and including a plurality of toggle members each having an end of which a substantial portion is of spherical form, and a movable adjusting member providing a thrust seat for one of said ends of one of said toggle members; said seat being in the form of a surface relatively angular to the direction of movement of said adjusting member.

6. In a clutch, the combination of an expandable friction ring, ring expanding means including a plurality of toggle members each having a plurality of ends of which a substantial portion is of spherical form, the one end of one member being positioned to thrust directly against an end of the other member, and a movable adjusting member providing a thrust seat for the other end of one of said toggle members, said seat being formed as a surface positioned at an angle to the direction of adjusting member movement.

7. In a clutch the combination of an expandable friction ring, ring expanding means including a plurality of toggle members each having a plurality of ends, a substantial portion of which is of spherical shape, one end of one member being positioned to thrust directly against an end of the other member, and a plurality of movable adjusting members each providing a thrust seat for the other end of one of said toggle members, said seat being formed on each adjusting member as a surface positioned in angular relationship to the direction of movement of the adjusting member.

In witness whereof I have affixed my signature.

FRED A. PARSONS.